(No Model.)

W. TUCKER.
SAW SHARPENING DEVICE.

No. 327,416. Patented Sept. 29, 1885.

Attest:
Geo. T. Smallwood
J. Henry Kaiser

Inventor.
William Tucker,
By Knight Bros.
attys.

UNITED STATES PATENT OFFICE.

WILLIAM TUCKER, OF EAST BROOKFIELD, MASSACHUSETTS.

SAW-SHARPENING DEVICE.

SPECIFICATION forming part of Letters Patent No. 327,416, dated September 29, 1885.

Application filed May 23, 1884. (No model.)

*To all whom it may concern:*

Be it known that I, WILLIAM TUCKER, a citizen of the United States, residing at East Brookfield, in the county of Worcester and State of Massachusetts, have invented certain new and useful Improvements in Saw-Filing Machines, of which the following is a specification.

My invention relates to rotatory spiral files for sharpening straight saws—such as hand-saws and the like; and it consists, particularly, in a spiral file formed upon the surface of a metal cylinder in such manner as to leave a sufficient space between each thread of the spiral to admit every alternate tooth of the saw to be sharpened. The saw is placed upon a flat smooth table, and being held up against the file by hand, is fed along and sharpened by the rotation of the file.

Figure 1:
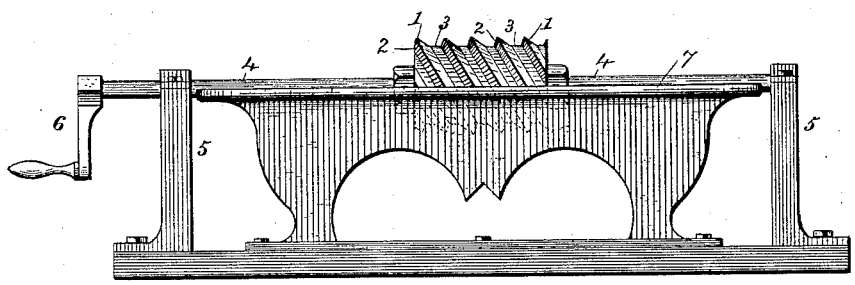
Figure 2:
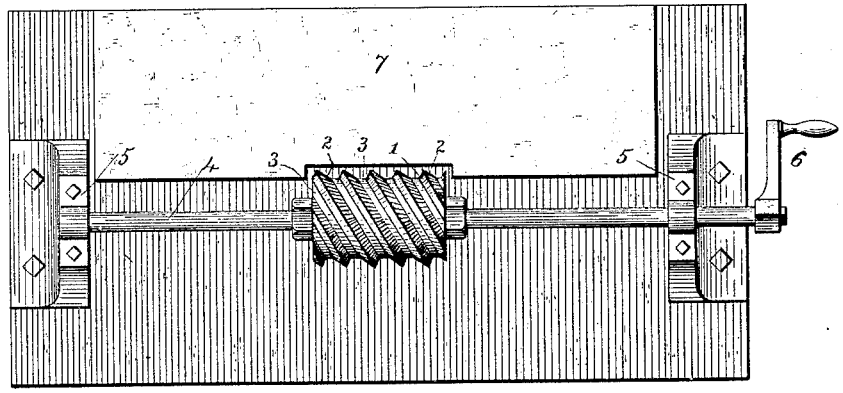

In order that the invention may be better understood, I will proceed to describe it with reference to the accompanying drawings, in which Figure 1 is a side elevation of my improved saw-filing machine. Fig. 2 is a plan thereof.

1 represents the spiral file, milled on one side, 2, and so formed upon the surface of a metal cylinder as to leave between the threads flat spaces 3, which receive every alternate tooth of the saw being sharpened. Half of the teeth of the saw will thus be sharpened at one operation and the other half at a second operation, files of opposite spirality being required for the two operations. The pitch of the spiral is made according to the "fleam" to be given to the edge of the tooth.

The file-cylinder is mounted on arbor 4, which has bearing in standards 5, and is adapted to be rotated by hand by means of winch 6 or otherwise. 7 is a smooth rest or table, upon which the saw to be sharpened is laid, and it is then pressed by hand against the file while the latter is set in rotation, thus sharpening the cutting-edges of the saw and feeding it forward simultaneously.

It will be seen that by bearing on several teeth at once, the action of the file is equalized and evenness of work is secured.

Having thus described my invention, the following is what I claim as new therein and desire to secure by Letters Patent:

1. A rotatory saw-file of spiral form, formed upon a metallic cylinder, with intervening spaces or ways for each alternate tooth of the saw, substantially as set forth.

2. The combination, with a rotatory spiral file, mounted as shown and described, of a flat rest or table for a straight saw, substantially as and for the purpose set forth.

WILLIAM TUCKER.

Witnesses:
 HENRY M. TOWER,
 GEORGE E. FORBES.